March 31, 1970 D. O. WECK 3,503,726
METHOD AND APPARATUS FOR DYNAMICALLY DISTRIBUTING
MOLTEN MATERIAL ONTO A SPINNER SURFACE
Filed April 5, 1967
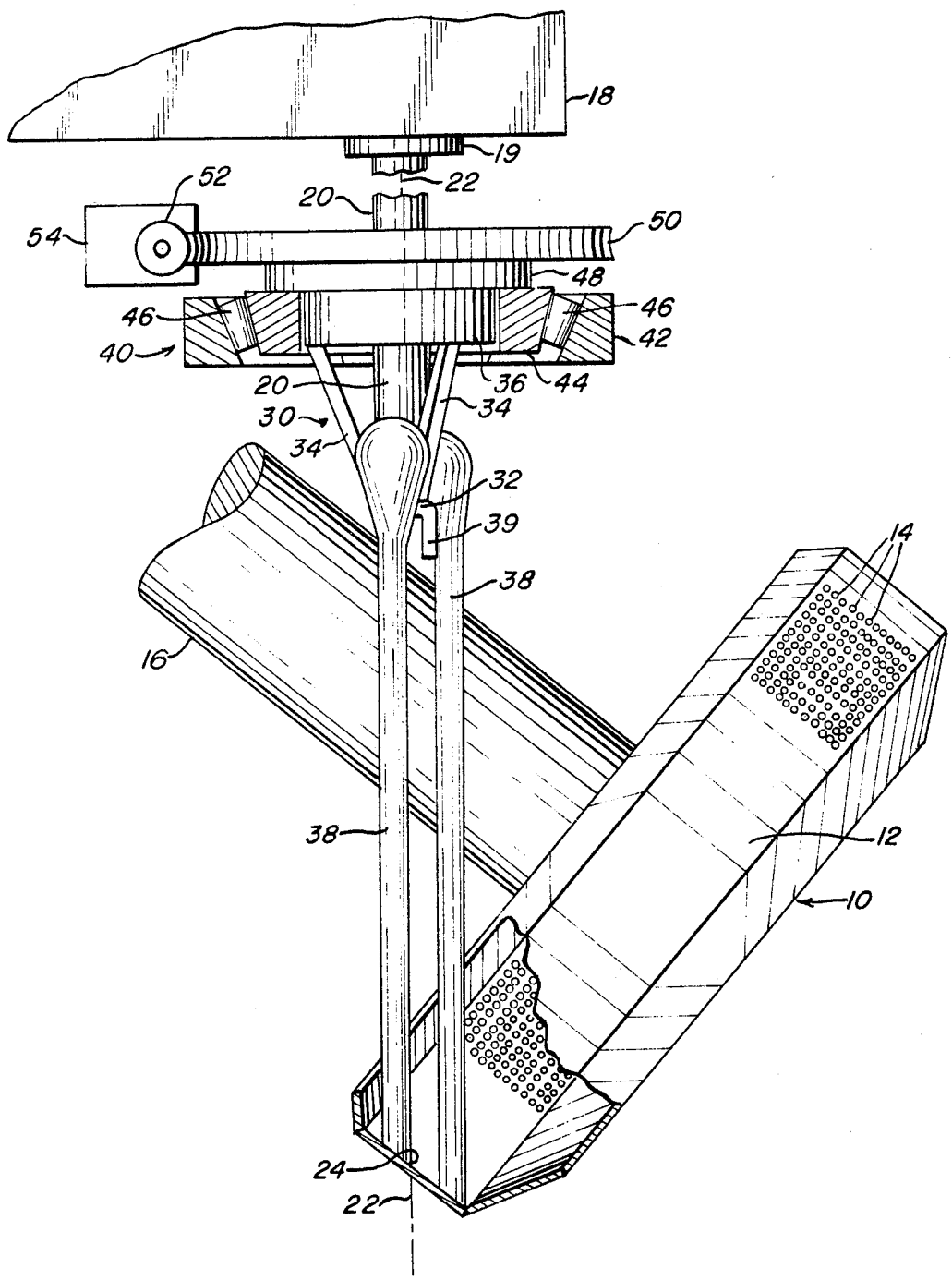
INVENTOR.
DIETER O. WECK
BY PENDLETON, NEUMAN
SEIBOLD & WILLIAMS
ATTORNEYS United States Patent Office 3,503,726
Patented Mar. 31, 1970

3,503,726
METHOD AND APPARATUS FOR DYNAMICALLY DISTRIBUTING MOLTEN MATERIAL ONTO A SPINNER SURFACE
Dieter O. Weck, Wabash, Ind., assignor to United States Gypsum Company, Chicago, Ill., a corporation of Delaware
Filed Apr. 5, 1967, Ser. No. 628,631
Int. Cl. C03b 19/04
U.S. Cl. 65—15                                              3 Claims

ABSTRACT OF THE DISCLOSURE

A stream of molten glass is directed into a rotatable distributor which is positioned over the upwardly exposed inner surface of the perforate band of a spinner mounted on an inclined shaft. The distributor divides the glass into a plurality of spaced discrete streamlets which are directed onto said inner surface in a predetermined pattern, and the distributor is continuously rotated about a substantially vertical axis at a relatively low speed to distribute the molten glass across the perforate band of the spinner.

CROSS-REFERENCE TO RELATED APPLICATION

This application pertains to improvements in methods and apparatus of the type disclosed in the copending application of William F. Porter, Ser. No. 618,895 filed Feb. 27, 1967.

BACKGROUND OF THE INVENTION

Field of the invention

This invention relates to spinning mineral fibers and more particularly relates to methods and apparatus for distributing molten glass onto a perforate rim of a rapidly rotating spinner.

Description of the prior

In the manufacture of glass fibers or filaments it is well known to direct a stream of molten glass from a furnace or other source thereof to the interior of a rapidly rotating spinner. Centrifugal force causes the melt to flow through orifices in the rim of the spinner whereupon it may be attenuated or processed in various way to form fibers. Such spinners often are provided with many orifices, e.g., several thousand, arranged over a wide band around the periphery of the spinner. Proper distribution of the molten glass over this perforate band is important to satisfactory fiberizing operations and long rotor life.

The aforementioned Porter application notes some of the particular difficulties encountered with prior systems for feeding molten glass to a spinner having a wide perforate band, and discloses methods and apparatus for overcoming these difficulties.

SUMMARY OF THE INVENTION

It is an object of this invention to provide further improvements on the methods and apparatus for distributing molten glass as disclosed in said Porter application. It is a further object of this invention to provide a another method for distributing molten glass over the interior surface of a perforate band of a fiberizing spinner.

In general the foregoing objects are achieved by locating a continuously rotating divider element intermediate a source of a stream of molten glass and a fiberizing spinner having a perforate peripheral wall with an upwardly exposed inner source. The divider intercepts the glass stream and forms it into spaced streamlets which are oscillated across a predetermined area of the interior surface of the perforate spinner wall due to the rotary motion of the divider.

For a more complete understanding of this invention reference should now be had to the drawing wherein an embodiment is illustrated by way of example of the invention.

BRIEF DESCRIPTION OF THE DRAWING

The drawing is a side elevation view, partly in section, of a fiberizing apparatus employing teachings of this invention.

DESCRIPTION

Referring to the drawing, there is indicated generally a spinner 10 having a sidewall 12 formed with a band of fiber-forming orifices, as shown schematically at 14. The spinner is mounted on an inclined shaft 16, e.g., inclined at about 40° to the horizontal, and is adapted for rotation at high speeds, e.g., 2000 r.p.m., by conventional means, not shown. A stream of molten glass 20 is supplied from a forehearth or other source 18 through a bushing 19 above the spinner. The bushing 19 is located so that the extended axis 22 of the molten stream intersects the rotor near the midpoint 24 of the upwardly exposed inner surface of the perforate band.

A stream divider or distributor indicated generally by the number 30 is located to intercept the stream of molten glass 20. The distributor 30 is generally of a cage or basket construction as disclosed in the aforementioned Porter application and comprises a deflector plate element 32 and spaced stream divider bars 34 usually disposed symmetrically therearound. These bars extend upwardly from the deflector plate element to divide the molten glass into streamlets 38 and are supported at their upper ends by a ring 36. By way of illustration, the distributor 30 includes three such divider bars 34, but their number may be varied in accordance with conditions of operation. A streamlet directing tab 39 may extend downwardly at the edge of deflector 32 in each space between adjacent bars 34.

The divider bars 34 may diverge upwardly from the deflector as illustrated to provide greater space between their upstream ends than at the deflector 32 so that as the flow of molten glass 20 increases and the head standing above the deflector rises, the greater space between the bars permits more glass to flow.

The divider 30 is rotatably supported, such as by being mounted in a roller bearing indicated generally by the numeral 40. The bearing 40 includes a suitably supported outer race 42 and an inner race 44 supported in race 42 by a plurality of tapered rollers 46. The ring 36 is disposed within the inner race 44 and is supported upon this race by an annular flange 48 secured to ring 36. An annular worm wheel 50 is secured to the flange 48 and is driven by a worm 52 which is rotated by suitable drive means, such as an electric motor and reduction gear drive indicated schematically at 54.

When the illustrated apparatus is in operation, molten glass is supplied from the source 18 in a stream 20 which falls freely along the substantially vertical axis 22. The viscous molten glass impinges on the deflector 32, builds up a head thereon, and flows divergently toward the margins of the deflector. The divider bars 34 divide this divergent flow and cause the viscous melt to be discharged over the discharge lips between the bars 34 in discrete spaced streamlets 38 which drop to the spinner along separate spaced paths substantially parallel to the axis of the original stream 20.

The horizontal dimensions of the deflector at the discharge lips are such that the falling sreamlets will impinge on the inner surface of the perforate peripheral wall 12 of the spinner. In the illustrated apparatus, this requires that the group of parallel streamlets be within the projection of the width of the bottom portion of the perforate band on a horizontal plane. There is some tendency of the stream to neck-in at the discharge lips. Accordingly, the horizontal dimension of the deflector at the discharge lips, measured parallel to a vertical plane through the rotor axis, may approximate or be only slightly less than the corresponding horizontal dimension of the target area.

During operation of this apparatus, the worm 52 is preferable driven continuously at a uniform rate such that the worm wheel 50 and the divider 30 are caused to revolve in bearing 40 at a slow speed, e.g., less than about 60 revolutions per minute. This rotation causes the streamlets 38 to move in a circular path about the axis 22, thus effectively oscillating or sweeping each streamlet back and forth across the perforate area of wall 12. As the speed of rotation of the divider is increased to which this can be tolerated is dictated by the dimensions and geometry of the apparatus.

The movement of the streamlets obtained in the above described operation insures that there will be no areas on the perforate band that do not receive molten material, even at relatively low rates of flow of the glass which provide small streamlets. The continuous movement of the streamlets assists in avoiding any imbalance of feeding to various areas of the spinner due to unintentional variations in the flow rates of the individual streamlets, and assists in avoiding wear paths on the spinner. Further, the oscillation of the streamlets due to the relatively slow uniform rate of rotation of the distributor provides a substantially trochoidal though essentially sinusoidal path of deposition of each streamlet on the rapidly rotating perforate band, i.e., a trochoidal curve of the form obtained when the tracing point is at a distance from the center of the rolling circle much less than the radius of the circle. This provides a much greater rate of deposit of the glass over each edge portion of the perforate band than over the center portion, which assists in minimizing or avoiding excessive heating of the center portion of the band while maintaining the desired temperature of the edge portions despite the much higher rates of heat dissipation from the edge portions.

An appreciation of the distribution results which may be obtained with the aforedescribed apparatus may be enhanced by consideration of a specific example. With one spinner such as that illustrated herein having a diameter of 11½" with 10,000 orifices, each about 0.025" to 0.030" in diameter, distributed over a peripheral band 1½" wide and being rotated at 2500 r.p.m. (about 1000 g centrifugal force) for forming glass fibers, a quantity of molten glass equivalent to a head of about 0.2" over the perforate band may be discharged through the orifices in about 3.5 seconds. If the distributor 30 is rotated at about 17 r.p.m., each streamlet will complete one full oscillation across the width of the perforate band and return in this period of time. At 35 r.p.m., two full oscillations will be completed by each streamlet in the same period.

The advantages of this invention also may be obtained with the stream divider being driven in a rotary oscillating motion through an arc about axis 22. To impart such an oscillatory motion to the divider, a cam, an eccentric drive, a reversible drive in unit 54, or the like may be employed in the drive system. The rate of rotation or oscillation may be uniform, as indicated above, or may be nonuniform to obtain various rates of desposition on various portions of the perforate band.

It is evident from the foregoing that novel methods and apparatus have been developed for effecting improved distribution of molten glass over the perforate band of a fiberizing spinner.

While a particluar embodiment of the invention has been shown, it will be understood, of course, that the invention is not limited thereto since modifications may be made by those skilled in the art, particularly in light of the foregoing teachings.

I claim:

1. In apparatus for forming fibers comprising a rotatable spinner mounted on a shaft disposed at a substantial angle to the vertical and including a perforate peripheral band having the inner surface of the lower portion of such band exposed upwardly, said perforate band being of substantial width as measured parallel to said shaft, a stream distributor for receiving molten fiber-forming material and having a plurality of discharge outlets spaced from one another and disposed over said upwardly exposed inner surface to drop such material onto said inner surface of said lower portion in a plurality of freely falling separate streamlets, the improvement comprising means supporting said distributor for rotational movement about a vertical axis and drive means connected to said distributor for slowly and continuously driving said distributor in such rotational movement to move said streamlets transversely of said lower portion of said perforate band and thereby to distribute said material thereacross.

2. Apparatus as in claim 1 wherein said drive means includes means for rotating said distributor at a uniform rate, said outlets being so disposed that each of said streamlets is moved by such rotation along a circular path having a diameter corresponding to the width of the projection of said lower portion of said perforate band on a horizontal plane, to continuously move each of said streamlets back and forth across the width of said perforate band.

3. Apparatus as in claim 1 wherein said distributor driven in rotational movement by said drive means comprises a deflector transverse to said vertical axis for receiving a supply stream of molten material and for discharging such material over its peripheral edge, and spaced dividers at the periphery of said deflector for dividing such material into such streamlets.

References Cited

UNITED STATES PATENTS 3,372,013   3/1968  Porter _____ 65—6 X
3,387,960   5/1968  Erdenberger _____ 65—8 X S. LEON BASHORE, Primary Examiner R. L. LINDSAY, JR., Assistant Examiner U.S. Cl. X.R.

18—2.6; 65—8; 264—8

UNITED STATES PATENT OFFICE
CERTIFICATE OF CORRECTION

Patent No. 3,503,726      Dated March 31, 1970

Inventor(s) Dieter O. Weck

It is certified that error appears in the above-identified patent and that said Letters Patent are hereby corrected as shown below:

The title should read -- Apparatus for Dynamically Distributing Molten Material onto a Spinner Surface --. Column 1, line 29, "618,895" should read -- 618,898--; line 38, after "prior" insert -- art --; line 45, "way" should read -- ways --; line 68, "source" should read -- surface --. Column 3, line 7, "preferable" should read --preferably --; line 14, after "increased" insert -- , the streamlets tend to diverge as they fall. The extent --.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents